No. 897,501. PATENTED SEPT. 1, 1908.
M. O. TROY.
SYSTEM OF ELECTRICAL DISTRIBUTION.
APPLICATION FILED NOV. 11, 1905. RENEWED FEB. 24, 1908.
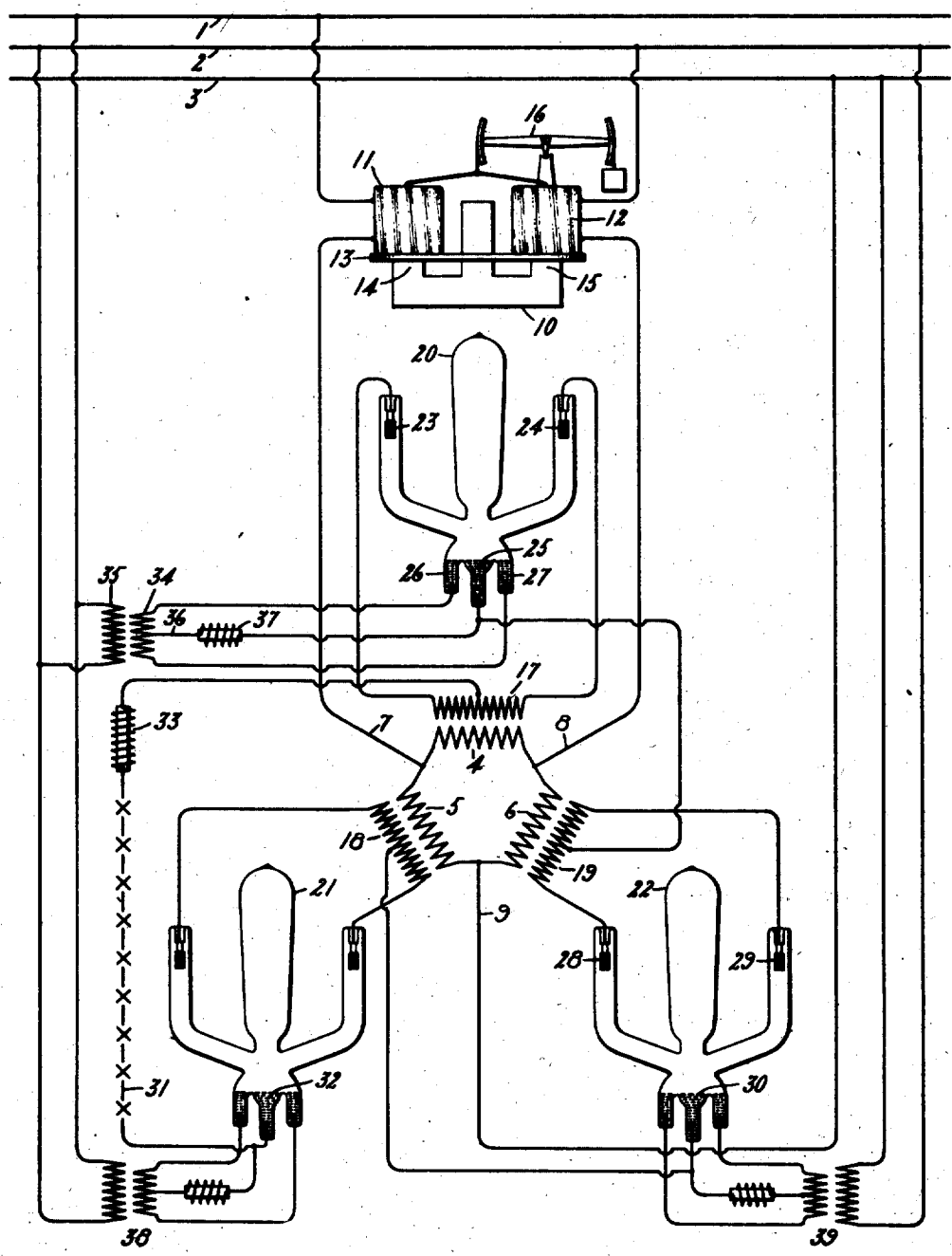
Witnesses:
George H. Tilden.
Margaret E. Wooley
Inventor:
Matthew O. Troy,
by Albert H. Davis
Att'y.

UNITED STATES PATENT OFFICE.

MATTHEW O. TROY, OF SCHENECTADY, NEW YORK, ASSIGNOR TO GENERAL ELECTRIC COMPANY, A CORPORATION OF NEW YORK.

SYSTEM OF ELECTRICAL DISTRIBUTION.

No. 897,501.

Specification of Letters Patent.

Patented Sept. 1, 1908.

Application filed November 11, 1905, Serial No. 286,830. Renewed February 24, 1908. Serial No. 417,393.

*To all whom it may concern:*

Be it known that I, MATTHEW O. TROY, a citizen of the United States, residing at Schenectady, county of Schenectady, State of New York, have invented certain new and useful Improvements in Systems of Electrical Distribution, of which the following is a specification.

My present invention relates to a novel means whereby alternating current may be converted into direct current and fed to a distribution circuit.

More especially, my invention relates to means whereby a high voltage constant direct current may be obtained from a constant potential alternating current system. Where the ordinary constant current transformer with relatively movable coils is employed for this purpose, insulation difficulties and the like occur where it is desired to employ extremely high voltages, such as 25,000 volts and upwards, in the secondary circuits. To obviate these troubles, I have devised a system in which the current transformation is effected by ordinary transformers of the constant potential type, which transformers may more readily be insulated for the high voltages than can transformers with relatively movable coils.

To secure the desired constant current regulation I provide the supply circuit for the transformers with constant current regulating devices. Also, instead of employing one secondary to supply the total alternating voltage to the rectifier used for changing the alternating current into direct current, I use a number of secondaries and I connect them with their corresponding rectifiers so as to add their voltages together and thereby supply a resulting very high voltage to the consumption circuit. I thereby obtain the desired voltage on the consumption circuit by combining the voltages of a number of secondaries, each of which secondaries may be readily insulated and otherwise protected against the electric stresses of a voltage, which is only a part of that which would be necessary in case a single secondary were employed to supply the total voltage.

The novel features which characterize my invention I have pointed out with particularity in the appended claims. The invention itself, however, will be better understood by reference to the following description taken in connection with the accompanying drawings, which represent diagrammatically one embodiment which my invention may assume in practice.

In the drawings, I have by way of illustration, shown my invention as applied to a multiphase alternating current system. The system here chosen is of the three-phase type, the supply mains of which are indicated at 1, 2 and 3. Current from these mains is fed to an ordinary three-phase transformer, or to three single-phase transformers connected together in any usual manner to receive the three-phase current from the supply system. The primaries are here indicated as 4, 5 and 6 and, by way of illustration, are shown connected in delta. The leads by which current is supplied to these primaries are indicated at 7, 8 and 9.

In order to produce the desired constant current regulation of the system so that the secondaries may supply current of constant value, I connect constant current regulating devices in the supply leads going to the transformers. In the present instance I find it convenient to connect these devices with two of the main leads only since the other lead, serving as a return for the first two, need not be so provided. Any suitable regulating means may be employed, though for purposes of illustration I have represented in the drawings a regulator consisting of a three-legged core 10 having coils 11 and 12 mechanically connected together as by a cross-bar 13 and movable lengthwise over the respective outside core legs 14 and 15. The coils are balanced against the magnetic pull of the combination by any suitable means, such as a pivoted counterweight lever 16. The coils 11 and 12 before mentioned, are connected respectively in series with the supply leads 7 and 8. Constancy of current is maintained by the relative movement between the coils 11, 12 and the core member 10. Thus, an increase in current is counteracted by an increased attraction between the coils and the core, which thereby move into better inductive relation to each other and, by reason of the increased inductance thus produced, restore the current to its proper value.

The transformer secondaries corresponding to the primaries 4, 5 and 6 before mentioned, are indicated respectively at 17, 18 and 19. Each secondary is connected to a vapor electric rectifier of a type now well-known in the art. These rectifiers are indicated respectively, at 20, 21 and 22 and obviously may vary widely in construction. As here illustrated, however, each rectifier consists of a highly exhausted glass receptacle or envelop, sometimes called a tube, provided with a plurality of main anodes, a cathode, usually of mercury, and a plurality of starting and maintaining anodes arranged adjacent to the cathode. Thus for example, in the rectifier 20 the main anodes are indicated at 23 and 24, the cathode at 25, and the starting or auxiliary anodes at 26 and 27.

In connecting up the rectifiers in circuit they are arranged so as to add together their rectified voltages and supply the same to a common consumption circuit. To this end the main anodes of each rectifier are connected directly to the secondary coil to which they correspond, while the cathode of the rectifier is connected to an intermediate point in the adjacent secondary of the series. Thus the outside terminals of the secondary 17 are connected to the anodes 23 and 24; while the cathode 25 is connected to the middle point of the secondary 19. The terminals of this latter secondary are similarly connected to the anodes 28 and 29 of the rectifier 22, while the cathode 30 of this rectifier is connected to the middle point of the secondary 18. This secondary is connected to the rectifier 21. The consumption circuit 31, including a series of arc lamps or the like, is connected between the cathode 32 of the remaining rectifier 21 and the middle point of the first mentioned secondary 17. An inductance coil 33 is connected in series with the consumption circuit in order to smooth out the current waves and at the same time to produce an overlap in the current waves from the anodes of the respective rectifiers and thereby enable them to maintain continuous rectifying arcs.

In order to start up each rectifier, I have provided the starting anodes before mentioned. Thus in the case of the rectifier 20 the starting anodes 26 and 27 are connected to the secondary 34 of a small constant potential exciting transformer, the primary 35 of which may be supplied from a pair of the supply mains 1, 2 and 3. A lead 36 extends from the middle of the secondary 34 to the cathode 25 and includes in series therewith an inductance 37. If now the rectifier 20 be shaken or tilted so as to cause momentary contact between the mercury of the starting electrodes and that of the cathode, a starting arc is produced which is maintained from the cathode alternately to the starting anode by means of the inductance 37 which causes each arc during one wave of current to be prolonged until a succeeding arc is started by the next wave of current, and so on. These starting arcs enable the main arcs from the anodes 23 and 24 to pass to the cathode, as well understood in the art. The other rectifiers 21 and 22 are similarly provided with exciting transformers 38 and 39 with their adjunctive devices in connection, for starting the corresponding rectifiers.

The starting means for each rectifier being set into operation, the rectifiers start into operation and supply current to the consumption circuit 31. The inductance coil 33 may then enable the rectifiers to operate independently of their starting arcs by causing overlapping current waves between the anodes of the respective rectifiers. The starting circuits and exciters for the respective rectifiers may then, if desired, be disconnected, though I sometimes prefer to leave them in operation to provide against any interruption or violent current fluctuations which may occur in the consumption circuit.

It is evident that various modifications may be made in the construction and mode of application of my invention, for which reason I do not wish to be limited to the precise details shown and described.

What I claim as new and desire to secure by Letters Patent of the United States, is,

1. The combination of a source of multiphase, constant-potential, alternating current, constant potential transformer primary windings supplied with current from said source, a constant current regulator for the leads of said primary windings, secondary windings, a rectifier for each secondary winding, connections interlinking the rectifiers in series, and a consumption circuit traversed by the current flowing through said rectifiers.

2. The combination of a plurality of constant potential transformer primaries and secondaries, means for supplying a constant current to said primaries, rectifiers for said secondaries, each of said rectifiers having a plurality of positive electrodes and a single negative electrode, connections interlinking the rectified circuits in series, and a consumption circuit fed by the rectified current from said rectifiers.

3. The combination of a constant potential alternating current source, leads extending therefrom, a constant current regulator operatively related to said leads, transformer primaries supplied with current from said leads, secondaries operatively related to said primaries, each of said secondaries being provided with a neutral connection, a rectifier for each secondary having positive electrodes connected to the terminals of said secondary, and a negative electrode connected to the neutral wire of another secondary, and current consuming means connected between the neutral connection of one secondary and the negative electrode of one of the rectifiers.

In witness whereof I have hereunto set my hand this 10th day of November, 1905.

MATTHEW O. TROY.

Witnesses:
BENJAMIN B. HULL,
BERTHA SECOR.